United States Patent [19]

Sundberg et al.

[11] Patent Number: 4,619,222
[45] Date of Patent: Oct. 28, 1986

[54] ANIMAL TRAINING COURSE, ESPECIALLY FOR RACE HORSES

[75] Inventors: Bo Sundberg; Hans Jonason, both of Sundsvall, Sweden

[73] Assignee: HB Autonom

[21] Appl. No.: 706,858

[22] PCT Filed: May 29, 1984

[86] PCT No.: PCT/SE84/00204
§ 371 Date: Jan. 25, 1985
§ 102(e) Date: Jan. 25, 1985

[87] PCT Pub. No.: WO84/04869
PCT Pub. Date: Dec. 20, 1984

[30] Foreign Application Priority Data

Jun. 7, 1983 [SE] Sweden .............................. 8303194

[51] Int. Cl.[4] .............................................. A01K 29/00
[52] U.S. Cl. .................................. 119/15.5 R; 119/29; 272/5
[58] Field of Search ..................... 119/15.5 R, 29, 120; 105/154; 272/5, 70, 100

[56] References Cited

U.S. PATENT DOCUMENTS 920,346   5/1909  Kronenberger ........................ 272/5
4,433,627 2/1984  Forshee .......................... 105/154 X

FOREIGN PATENT DOCUMENTS 2301280  9/1976  France ............................. 119/15.5

Primary Examiner—Robert P. Swiatek
Attorney, Agent, or Firm—Larson & Taylor

[57] ABSTRACT

A training course for race horses or other animals has a guide (2) which extends along a preferably endless track (1) and follows the shape of the track. A plurality of mobile units or carriages are caused to travel along the guide by a motor in the lead carriage. Each unit or carriage includes a member (6) for tying the animal (5) to be trained thereto to make it move along the track without the help of a trainer. The exercise of the animal is controlled by monitoring its pulse rate.

4 Claims, 7 Drawing Figures

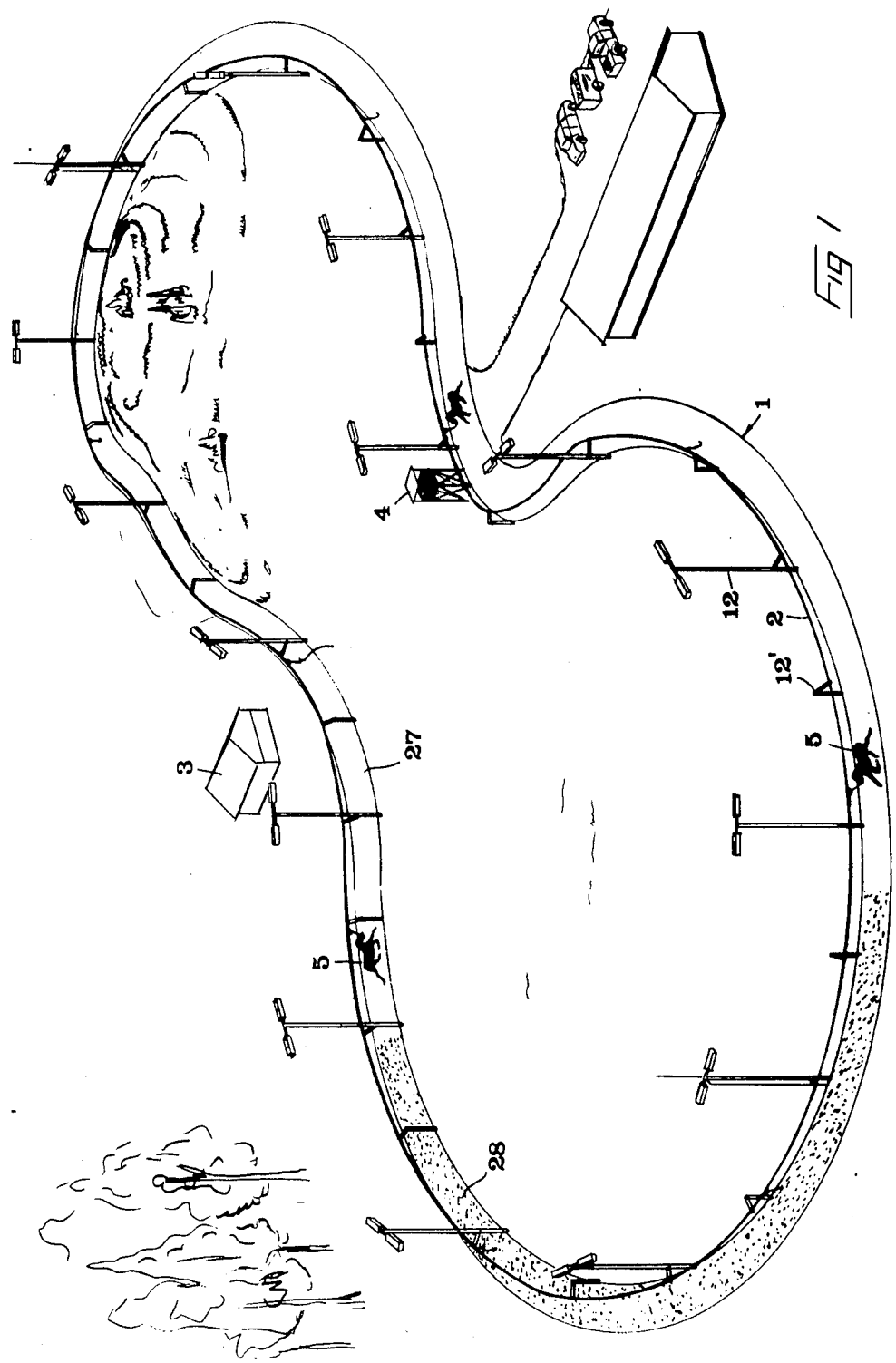

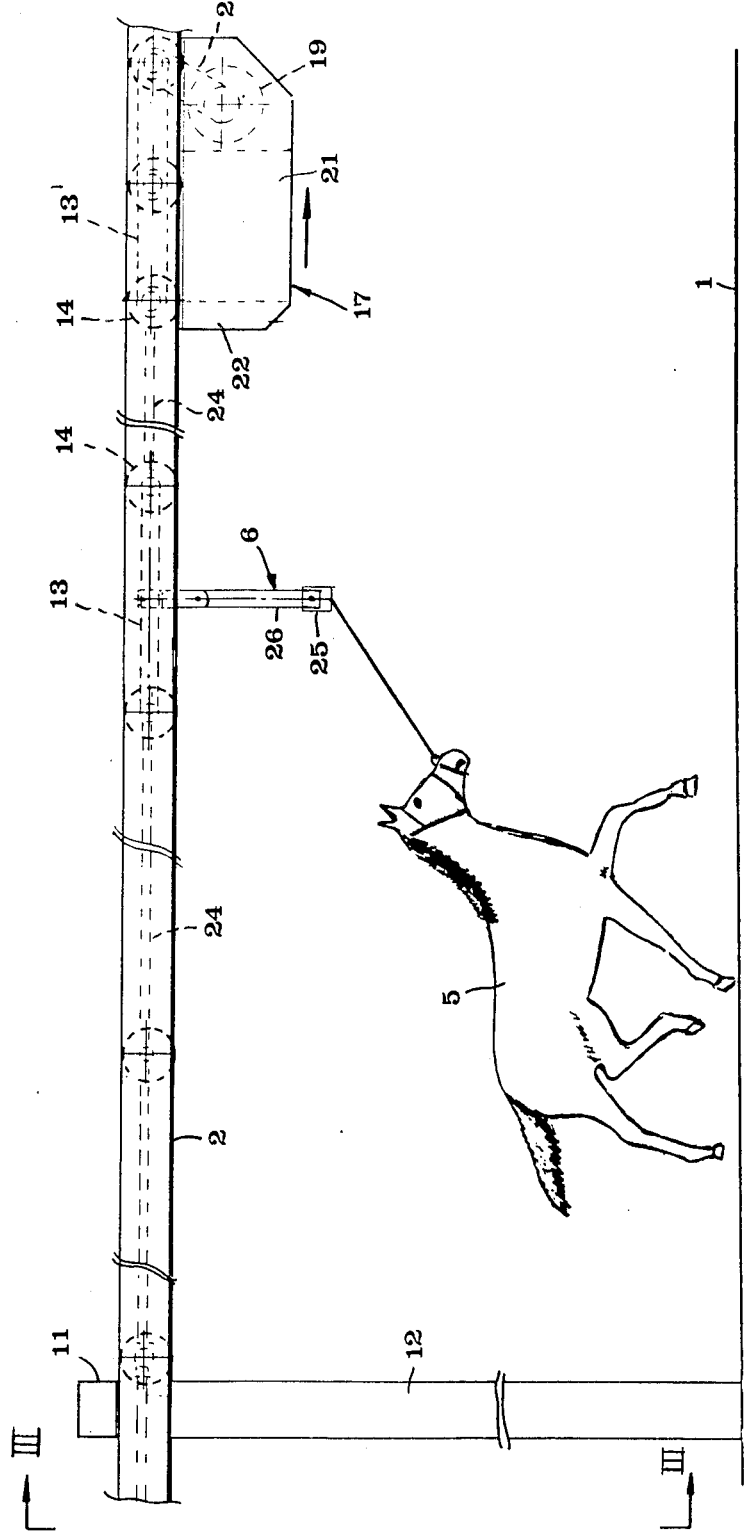

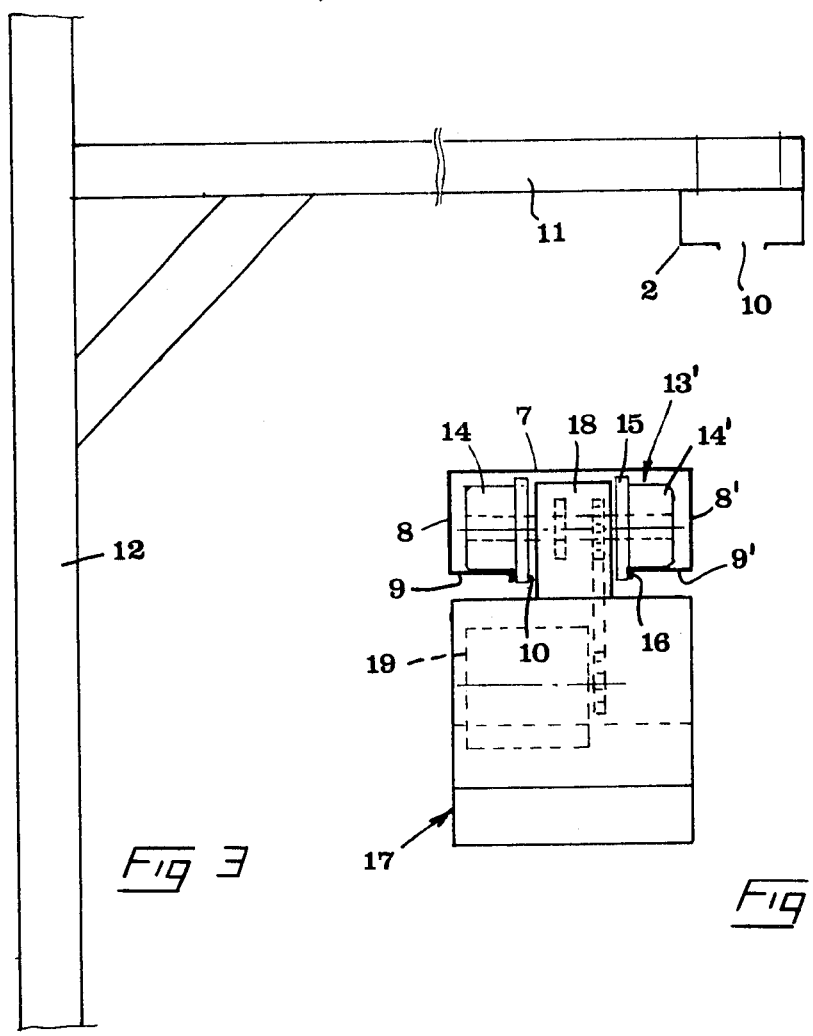
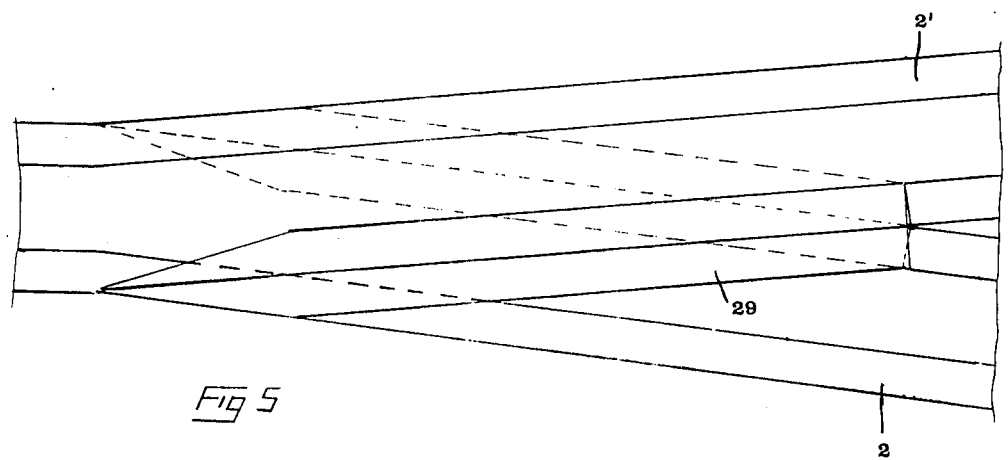

ANIMAL TRAINING COURSE, ESPECIALLY FOR RACE HORSES

TECHNICAL FIELD OF THE INVENTION

The invention relates to an animal training course, especially for race-horses, comprising a guide arranged along an endless track, following the shape of the track and having the form of a rigid, non-yielding guide along which a plurality of mobile wheel-mounted carriages are adapted to travel, each carriage comprising a depending member for tieing the animal to be trained thereto to make it move along the track without the help of a trainer.

PRIOR ART

Training courses of the above-mentioned type are previously known from U.S. Pat. Nos. 3,965,866 and 4,138,966 and DE pat. No. 2,634,724. The courses disclosed in these patent specifications have the features in common that each horse is individually tied to a separate, depending follower and tieing member, and that all available depending follower members of this kind are arranged along one endless transmission means extending along the entire length of the track and being driven along the track by a drive mounted at a suitable location beside the track. The individual tieing of the horses to separate depending members is advantageous in so far as the horses are then kept well apart, thus having no possibility of disturbing each other; in this way, appropriate training conditions are achieved. On the other hand, it is in practice most unfavourable to connect the separate depending members to an endless transmission means, driven by a stationary drive, i.e. a transmission means, the length of which corresponds to the length of the track as shown in the above-mentioned patent specifications. If the track is of considerable length, the frictional resistance from the transmission means moving along the entire length of the track will be enormous, thus involving a need for extremely powerful drives as well as a very large energy consumption for the propulsion of the depending members. In practice, the training courses disclosed can therefore only be given track lengths of twenty or thirty meters, which besides is evidenced by the fact that these tracks have been installed indoors.

BRIEF DESCRIPTION OF THE INVENTION

The present invention aims at eliminating the above-mentioned disadvantages of the previously known training courses of this type and creating conditions for building tracks of unlimited lengths. These and other objects are achieved according to the invention in that the carriages jointly form a train consisting of at least a first, leading carriage provided with a preferably battery-driven motor to drive the remaining, preferably trailing carriages of the train along the guide, and that said guide comprises a transceiver for controlling the operation of the carriage provided with the motor by actuating a receiver associated with said carriage and for reading physiological measured values, for example the pulse, of the animals from transmitters applied to them.

By arranging, in accordance with the principle of the invention, the carriages in the form of a train comprising a suitable number of carriages, for example 5-10, each consisting of a separate depending member, the track can be of unlimited length without causing but moderate friction forces. By reason of the remote control of the training course through the transceiver, there is achieved a very flexible training of the horses or animals as the speed of the carriage provided with the motor (the locomotive) may, in a simple way, be varied as desired, and as the physiological measured values, for example the pulse, of the horses can be read directly. Furthermore, the advantage should be emphasized that the track can be incorporated with the terrain in any desired manner and be brought to comprise both left-hand and righthand turns for the benefit of an all-round training of the horses.

BRIEF DESCRIPTION OF THE DRAWINGS

FIG. 1 is a general perspective view of a training course according to the invention.

FIG. 2 is a partial side view of a guide associated with the course.

FIG. 3 is a view along line III—III in FIG. 2.

FIG. 4 is an enlarged cross-sectional view of the guide.

FIG. 5 is an enlarged plan view illustrating a possible alternative design of the course.

DETAILED DESCRIPTION OF A PREFERRED EMBODIMENT OF THE INVENTION

Figure 6:
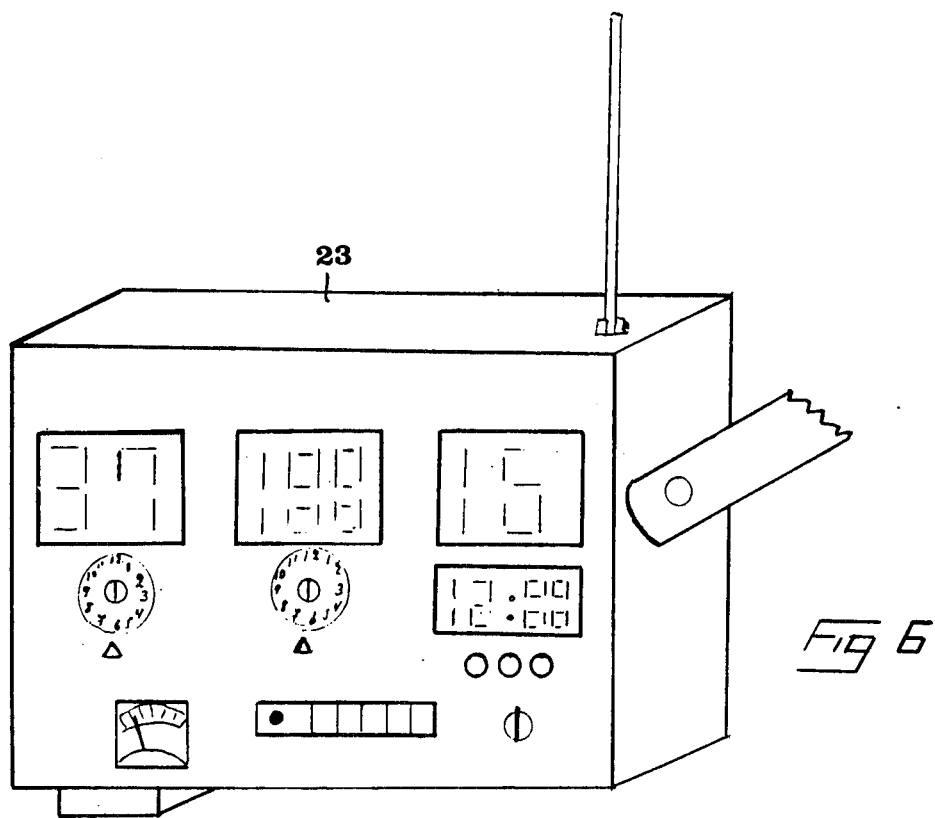
FIGS. 6 and 7 are perspective views indicating how a transceiver may be included in the course.

FIG. 1 shows an endless track 1 along which, in accordance with the principle of the invention, a guide 2 is arranged, which substantially follows the shape of the track 1. For example, this track may be built close to a trotting-track and in practice, it should have a length of at least some hundred meters, for example 300-500 meters. The track should preferably have an irregular, possibly curving shape as shown in FIG. 1, preferably with one or more rises along the track as indicated to the right in FIG. 1. In close connection to the track there may be located offices, parking-grounds, etc., as well as one or more buildings 3, 4 for supervising the training on the track.

In FIG. 1, 5 designates a number of horses being exercised on the track 1.

FIGS. 2-4 show in detail an embodiment of the guide 2 following the track 1. The guide has the form of a rigid, non-yielding guide mounted overhead, more specifically on a level which is considerably higher than the height of the animals, with a tieing member in the form of an arm 6 adapted to depend from the guide 2 to permit tieing the individual horse thereto. In practice, the guide 2 is assembled of a plurality of sections, arranged in extension of each other, each section having an upper, comparatively wide flange 7 (see FIG. 4), two spaced apart side flanges 8, 8' directed downwardly from said flange 7, and two lower or bottom flanges 9, 9' extending inwardly from the side flanges 8, 8' to the center of the section and being of such a width that a gap 10 is formed between them.

The guide 2 of the embodiment shown is arranged at the free end of a bracket 11 projecting inwardly over the track 1 and connected to a post or the like 12 placed by the side of the track 1. As shown in FIG. 1, these posts 12 may also be used as lamp posts, and between neighbouring lamp posts, one or more posts 12' may be arranged exclusively for supporting the guide 2.

As appears from FIG. 2, the tieing arm 6 is carried by a unit 13 movable along the guide 2 which unit has the form of a carriage and is part of a train comprising a plurality of interconnected carriages. The leading carriage 13' of this train is shown to the right in FIG. 2. All carriages of the train comprise one or more wheel pairs 14, 14' supported by the bottom flanges 9, 9' of the guide sections, the wheels having flanges 15 engaging with and guided by rims 16 which extend downwardly at a distance from the inner edges of the bottom flanges 9, 9'. The leading carriage 13' of said train is connected to a drive unit, generally designated 17, hanging down from the underside of the carriage and supported by a carrier 18 projecting through the gap 10. The drive unit comprises an electric motor 19 connected to one wheel pair of the carriage via a transmission 20, and a rechargeable battery 21 for driving the motor 19. Furthermore, the unit 17 may comprise a receiver 22 for remote control of the operation of the unit from a combined transceiver 23 shown in FIG. 6. The carriages making up the train movable along the guide are interconnected by means of connecting elements 24 which may have any desired design provided they allow taking the various curves of the guide. For example, the connecting elements may consist of bars or links which are hingedly interconnected to allow said curve-taking. A further alternative is the use of flexible elements such as cables or wires. In this connection it may be mentioned that the number of tieing arms 6 should preferably be 10 to 20 to enable training a corresponding number of horses.

FIG. 2 shows that the tieing arm 6 comprises a divisible leash having a part 25 connected with the animal, and a part 26 connected with the carriage 13. These two parts are interconnected by means of a spring leaf or spring-loaded balls able to keep the parts together as long as the part 25 is exposed to a moderate tensile load. However, as soon as the tensile load exceeds a given value, the mechanism is triggered, releasing the part connected with the horse from the part 26. By this releasable leash, accidents may thus be avoided, should the horse stop or shy.

Reference is once more made to FIG. 1 which also shows that in the longitudinal direction of the track 1 there are two separate track sections 27, 28 consisting of different beddings. In the embodiment, the track section 27 may consist of a comparatively firm, gravelled bedding of about the same type as that of trotting-tracks, whereas the track section 28 may consist of loose sand with considerable depth, which makes it more difficult to run on this section of the ground, than on the section 27, thus requiring the exertion of greater strength. Of course, it is possible to divide the track 1 into more, varying sections than just two and let these sections have different beddings so as to provide varied training conditions for the horses.

It is also possible to arrange, beside the main track 1 and substantially parallel thereto, at least a second track with other features than the main track, arranging along this second track also a second guide, separated from but connected to the main guide 2. FIG. 5 illustrates a switching device 29 by means of which the train movable along the guides may be steered into one or the other guide 2 and 2', respectively. The switching device 29 simply consists of a flap which in the position shown by full lines steers the train or carriages into the guide 2', leading the horses into said second track, and in the position shown by broken lines steers the train along the main guide 2. A second track of this type may either extend along the entire length of the main track 1 or, preferably, along merely a limited part of track 1. In the second track, further track sections with other features than the sections in the main track 1 may be laid. It is even possible to arrange ponds in one of the two tracks for swimming exercise.

Furthermore, FIG. 1 shows how one or more lamp posts 12 are provided with lightning-conductors, separately earthed in the guide 2 and ensuring that a possible stroke of lightning is not propagated in the guide 2 and does not damage the horses.

Figure 7:
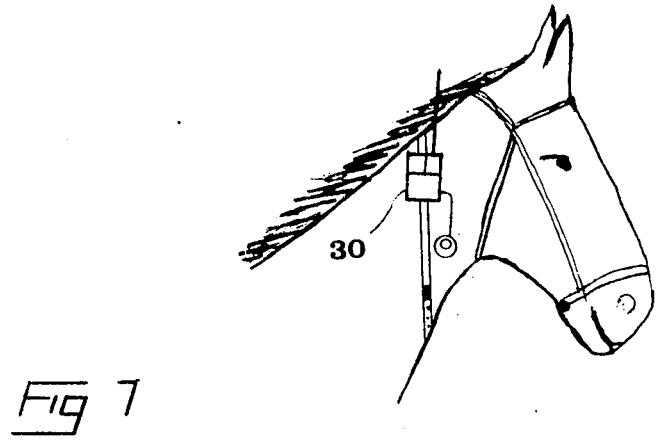

FIGS. 6 and 7 show how the combined transceiver 23 can operate together with a portable transmitter 30 applied to the individual horse for transmitting to the transceiver 23 signals with information about various physiological conditions of the horse, for example pulse, temperature, etc. The apparatus 23 should preferably be placed in, for example, the building 3 such that the trainer may easily supervise the condition of the horses being simultaneously trained on the track. Each transmitter 30 has its own channel or frequency which can be received in the apparatus 23 when one wishes to read the condition of an individual horse. In its function as a transmitter, the apparatus 23 can actuate the receiver 22 on the leading carriage 13' of the train moving along the guide 2 to adjust the speed of the train and also to start and stop it.

Use of the Invention

The training course can be supervised by a single person who especially in bad weather may stay in one of the buildings 3, 4. The single horse which is brought to the track is tied to a vacant tieing arm 6 and having tied all horses to be trained in this manner, the train of carriages 13', 13, etc is started. When the training rounds are finished, the horses are untied, and then a new set of horses are tied in the manner described. In this way, the training work may continue during an entire working day, one and the same groom being able to supervise and take care of the training of several horses, maybe ten or more, at the same time, implying that the other members of a small staff can perform other tasks during the running exercise of the horses involved.

Possible Modifications of the Invention

The invention is of course not limited merely to the embodiment described and shown on the drawings. Thus, the carriages may be arranged such that their direction of movement can be reversed to change the direction in which the horses move along the track. In the embodiment shown, this is achieved by having the train comprise two motor carriages, one at each end of the train. Furthermore, it is possible to arrange a straight track with suitable turnarounds at its opposite ends. In connection to the track, auxiliary equipment of different kinds may be arranged, for example showers to remove sweat from the horses repeatedly during a running exercise. Such showers should preferably be arranged in direct connection to the guide 2, for example on a bracket 11.

It should also be stressed that the training course described is not limited to the training of horses, either gallopers or trotters, but it may also be utilised for the training of other animals such as dogs.

We claim:
1. An animal training course, especially for racehorses, comprising:
   an endless track;
   a guide arranged along said endless track, said guide being rigid and non-yielding;

a plurality of mobile wheel-mounted carriages adapted to travel along said guide, each said carriage including a depending member for tieing an animal to be trained thereto to make the animal along said track by following said carriage;

a connecting means for connecting said plurality of carriages to form a train of said carriages;

wherein said train includes a first, leading carriage and a motor mounted on said first carriage for driving said first carriage and the remaining, trailing carriages of the train along said guide;

a control means for controlling the operation of the train including a transceiver means for transmitting control signals and a receiver means actuated by the signals from said transceiver means for controlling said motor of said first carriage and a transmitter means attached to the animal for reading physiological measured values of the animal and for transmitting signals indicative of the measured values, said transceiver means being adapted for receiving the transmitted signals of said transmitter means.

2. A training course as claimed in claim 1, characterized in that the depending member comprises a leash, divisible into two parts, having a part connected with the animal and a part connected with the associated carriage, said leash being releaseable from said carriage when a preferably predetermined, high tensil load is exerted on said leash.

3. A training course as claimed in claim 1, characterized in that the track in its longitudinal direction has at least two separate sections with different bedding features, for example firm gravel and loose sand, respectively, so as to provide varied training conditions along the track.

4. A training course as claimed in claim 1 characterized in that beside the track is arranged at least a second track with other features than the first-mentioned track and that along said second track there is a second guide which is separated from and preferably parallel to the first-mentioned guide, a switching device being arranged between the first-mentioned guide and the second guide to steer the carriages from the first-mentioned guide to the second guide and vice versa.

* * * * *